INVENTOR.
GUNTHER PFEIFER
BY Cecil J Arens
ATTORNEY

Jan. 6, 1959  G. PFEIFER  2,867,090
POWER ACTUATED BLEED STRUCTURE
Filed April 14, 1955  2 Sheets-Sheet 2

INVENTOR.
GUNTHER PFEIFER
BY Cecil J Arenz
ATTORNEY

United States Patent Office 2,867,090
Patented Jan. 6, 1959

2,867,090

POWER ACTUATED BLEED STRUCTURE

Gunther Pfeifer, South Bend, Ind., assignor to Bendix Aviation Corporation, South Bend, Ind., a corporation of Delaware Application April 14, 1955, Serial No. 501,238

6 Claims. (Cl. 60—54.6)

The present invention relates to the air purging of hydraulic pressure systems, and more particularly to the air purging of the master cylinder of hydraulic braking systems.

It is common knowledge in the brake art that entrapped air in a closed hydraulic braking system introduces an extremely troublesome factor contributing to unreliable operation of the brakes. Thus it is a principal object of this invention to provide a new and improved hydraulic braking system which can be simply and completely purged of air.

Another object of the invention is to provide a new and improved power cylinder for a hydraulic braking system which cylinder directs fluid flow into all portions of its piston chamber.

A further object of invention is to provide in a power brake system which includes a piston contained in a hydraulic cylinder, fluid directing means in said hydraulic cylinder to eliminate substantially all air entrapped therein giving rise to maximum fluid displacement during brake actuation.

Other objects and advantages of invention will become apparent during the course of the following description, reference being had therein to the accompanying drawings, in which.

Figure 1:
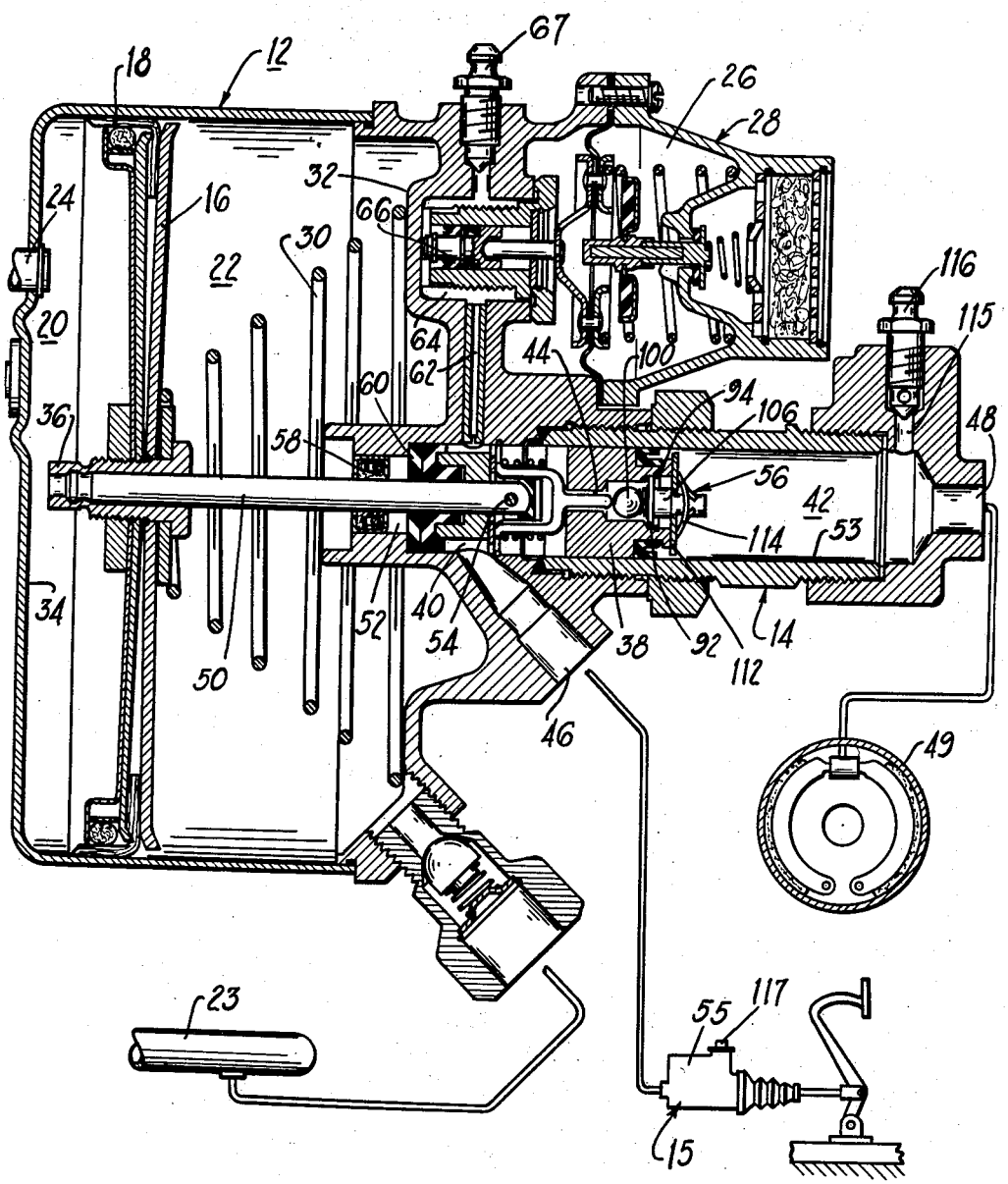
Figure 1 is a longitudinal sectional view of an embodiment of the present invention, with connections to a vehicle brake, manually operated master cylinder, and source of vacuum being shown diagrammatically.

In Figure 1 of the drawings, a differential air pressure power cylinder or power unit 12 is arranged to operate the piston in a hydraulic actuator cylinder 14, preferably with the assistance of pressure derived from a conventional manually operated master cylinder 15. The hydraulic actuator is carried by the power cylinder casing and provides a unitary assembly. Reciprocable within the power cylinder 12 is a power piston or pressure responsive movable wall 16 which is provided with the usual peripheral seal 18, and which divides the power cylinder into a controlled chamber 20 and a constant pressure chamber 22.

Although the present inventive concept is equally applicable regardless of the particular operating principles of the power unit, the illustrated embodiment of the invention is intended to use manifold vacuum and atmosphere as the source of power. The embodiment shown is known in the art as a "vacuum suspended" unit because the power piston 16 is subject to vacuum on both sides during periods of non-braking. Therefore, the constant pressure chamber 22 is connected by suitable means to a vacuum source, such as the usual intake manifold 23 of an automotive vehicle through suitable conduit means. Controlled chamber 20 is connected by means of conduit 24, only a portion of which is shown, with chamber 26 of a controlled valve 28, which regulates operation of the power cylinder.

Power piston 16 is biased to retracted position by means of a relatively heavy return spring 30, which is compressed between the forward end 32 of the power cylinder and the power piston 16. The released or retracted position of the power cylinder is determined by contact thereof with the rear wall 34 of the power cylinder casing, a projection 36 being provided at the rear of power piston 16 adapted to contact the rear wall of the power cylinder casing for this purpose.

Reciprocable in hydraulic actuator cylinder 14 is a piston 38, which divides said cylinder into a rear chamber 40 and a forward chamber 42. When piston 38 is in released position, as shown, communication between chambers 40 and 42 is permitted by passage 44 which extends longitudinally through the center of said piston. An inlet opening 46 is intended to permit communication of chamber 40 with the conventional manually operable master cylinder 15, suitable conduit means being provided. An outlet opening 48 is arranged to permit communication of chamber 42, through suitable conduit means, with the hydraulic motors which are to be operated, such as the conventional wheel cylinders of a hydraulic brake system, one being shown at 49.

A pressure transmitting rod 50 is secured to power piston 16 and extends through an opening 52 in the forward end of the power cylinder into the bore 53 of hydraulic cylinder 14, the forward end of rod 50 is secured to the hydraulic piston 38 by means of a positive connection such as the cross pin 54. With this arrangement, the power piston 16 controls both the pressure stroke and the retraction stroke of hydraulic piston 38, and the single return spring 30 serves the dual function of retracting both the power piston and the hydraulic piston.

When the combination power and hydraulic device is in released position, it is desirable that chambers 40 and 42 be in communication with one another in order that chamber 42 and the wheel cylinders may be compensated for volumetric variations of fluid through the manually operated master cylinder. The master cylinder is adapted to compensate for the volumetric variations in the fluid through its direct connection with the usual integral fluid reservoir 55. During the pressure stroke of hydraulic piston 38, it is necessary that communication between chambers 40 and 42 be prevented. A valve control assembly 56, which functions similarly to that shown in the patent to Ringer, No. 2,598,604 is utilized herein to permit the function of communication between the chambers 40 and 42 in a retracted position, and the prevention of communication between said chambers during an actuated condition.

Suitable wiper seal means 58 and hydraulic seal means 60 are provided about rod 50.

Chamber 40 is in communication through a passage 62 with a chamber 64 contained in wall portion 32 of the power cylinder. Said chamber 64 has located therein a fluid pressure responsive piston 66 operatively associated with control valve mechanism of the control valve 28 for actuating the power unit during a brake application. Contained in the upper portion of chamber 64 is a conventional bleed screw 67 for substantially removing all air entrapped in the upper portion of chamber 64.

Figure 2:
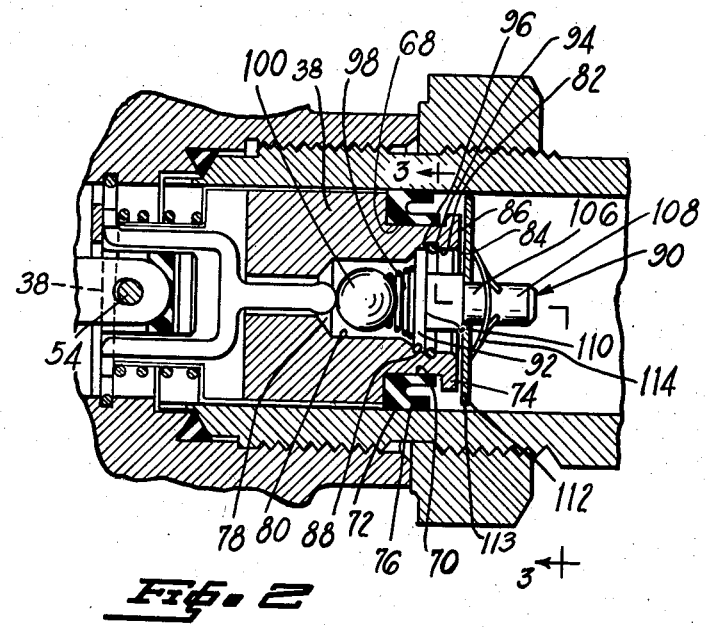
Figure 2 is an enlargement of the piston construction of the secondary or power assisted master cylinder of Figure 1.

As best shown in Figure 2, the piston 38 includes adjacent the end thereof in chamber 42, a reduced external diameter portion 68 providing a cylindrical surface 70 and a radial surface 72. Spaced apart from the radial surface 72 is a raised diameter portion 74 of a diameter less than the piston diameter but greater than the reduced diameter portion 68 and which with the radial surface 72, provides a groove on the end periphery of piston 38 to accommodate suitable seal means, such as a "double lipped" seal shown at 76 to prevent fluid leakage between chambers 40 and 42. Contained in piston 38 in communication with passage 44 is an annular open end chamber 78 having a cylindrical surface 80 and terminating in an increased diameter cylindrical portion 82 which includes a conical outwardly extending surfaced portion 84 opening toward chamber 42 and which terminates in an annular face 86 on the end of piston 38. The increased diameter portion 82 of chamber 78 forms an internal radial surface or shoulder 88 with the cylindrical surface 80.

Figure 3:
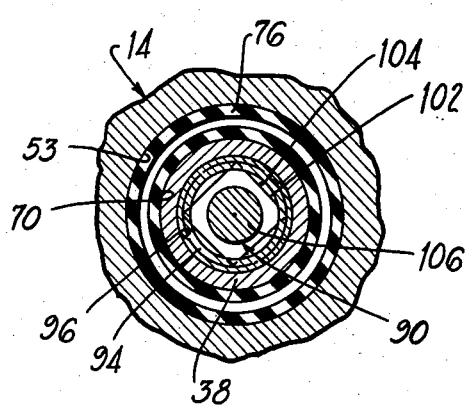
Figure 3 is a section view taken on line 3—3 of Figure 2.

Seated in the increased diameter portion 82 of chamber 78 and abutting the radial surface 88 is a rivet-like member 90 including a square base or head 92 which is held in position by means of a snap ring 94 fitting in a cooperating groove 96 axially spaced from the shoulder 88 and formed in the periphery of the increased diameter portion 82. It will be noted that the sides of the square base 92 of the rivet-like member 90 facing passage 44 provides an abutment for a spring 98 which is interposed between said base and a ball check 100 of the valve structure 56, the function of which is clearly described in Patent No. 2,598,604. As shown in Figure 3, the sides 102 of the square base 92 permit fluid passage from chamber 40 to 42, by forming with the cylindrical surface 80 segmental openings 104. The rivet-like member 90 includes, extending from base 92 into chamber 42, a stem or shaft member 106 concentric with respect to the bore 53 of cylinder 14. The stem member 106 includes a reduced portion 108 forming on the stem 106 an axially spaced shoulder 110. Mounted on the reduced stem portion 108 and abutting the shoulder 110 is a disc-like fluid directing member 112 held against shoulder 110 in any suitable manner, for example by means of a Tinnerman fastener 114. The axial relationship of shoulder 110 with respect to the annular face 86 of piston 38 in the chamber 42, is such that when the fluid directing member 112 is secured to the reduced portion 108, sufficient clearance remains to permit freedom of fluid movement between the annular face 86 of the piston member and the adjacent side of the fluid directing member 112. Member 112 is of a greater diameter than the cylindrical surface 68 of the piston 38, and has its peripheral edge 113 spaced from the bore 53 of cylinder 14, but in close proximity thereto, permitting free fluid flow between the annular face and member 112 and past the peripheral edge of member 112 and thence adjacent the bore 53 into chamber 42. Thus permitting efficient bleeding of entrapped air which will be subsequently described in detail.

Located at the upper end of cylinder 14, adjacent port 48, and in communication with the chamber 42 is a bleed passage 115 controlled by a conventional bleed screw 116.

In hydraulic cylinders of prior power actuators, it has been observed that effective fluid displacement has been appreciably diminished with a resulting loss of efficiency in braking due to air being trapped at the upper surface of the hydraulic cylinder and about the hydraulic seals located for example in the position of seal 76.

Bleeding of the hydraulic cylinder of applicant's device is accomplished as follows:

A conventional pressure bleeder (not shown) is applied to the reservoir opening 117 of the conventional master cylinder, and the bleed screw 116 of cylinder 14 is opened to permit the emission of fluid from passage 115. Pressure fluid is directed from the pressure bleeder into port 46, into chamber 40, through passage 44 into chamber 78, out of openings 104, between the annular face of piston 38 and the adjacent side of member 112 around the peripheral edge 113 of member 112 into chamber 42 along the bore 53 of cylinder 14, and finally out of passage 115. It is readily apparent that during this bleeding operation when the fluid passes past the annular face 86 of the piston 38 and over the peripheral edge 113 of member 112, any air bubbles entrapped between the seal 76 and the bore 53 of cylinder 14 are carried past the peripheral edge 113 of member 112. Furthermore, any air accumulating in the upper portion of chamber 42 is removed due to the force of the fluid being directed in close proximity to the upper portion of the bore 53. Upon observation that the fluid passing out of passage 115 contains no air bubbles, the bleed screw 116 may be closed and the bleed screw 67 may be opened to bleed the chamber 64 in the usual manner. And thus it is seen that the novel hydraulic piston structure of my device permits rapid, efficient, and positive bleeding of the hydraulic cylinder, providing maximum fluid displacement and accompanying increased braking efficiency.

A particular embodiment of my invention has been described, it will be understood by those skilled in the art that the object of the invention may be obtained by the use of constructions different in certain respects from that disclosed without departing from the underlying principles of the invention. I therefore desire by the following claims to include within the scope of my invention all such variations and modifications by which substantially the results of my invention may be obtained through the use of substantially or equivalent means.

I claim:

1. In a hydraulic pressure system, a hydraulic cylinder having a bore therein, a piston reciprocable in said bore and having fluid seal means on its outer periphery adjacent one end thereof for preventing fluid flow in either direction past said piston, said sealing means being immovably held in an unported annular recess in the outer surface of said piston member, said piston having a fluid passage therethrough, said fluid passage terminating in an annular face portion on the end of the piston adjacent said seal means, a support member carried by said piston, fluid directing means on said support member in close proximity to said annular face portion of said piston and including a peripheral edge in close proximity to said cylinder bore, and fluid bleed means in communication with the upper portion of said cylinder bore, whereby movement of bleed fluid through said piston is directed adjacent said annular piston face, past said piston seal means, adjacent said cylinder bore and out said bleed means removing substantially all air entrapped in said hydraulic cylinder.

2. In a hydraulic pressure system as set forth in claim 1, said seal means comprising a double-lipped seal member of resilient material.

3. In a hydraulic pressure system, a hydraulic cylinder having a bore therein, a piston reciprocable in said bore and having fluid sealing means on its outer periphery adjacent one end thereof, said piston having a fluid passage therethrough, said fluid passage terminating in an annular face portion on the end of the piston adjacent said sealing means, a support member carried by said piston, said support member comprising a rectangular base secured in said fluid passage and defining with said fluid passage segmental openings, and a stem member secured to said base and extending out of said fluid passage, said stem member including a reduced diameter portion forming a radial shoulder thereon axially spaced from the annular base of said piston member, fluid directing means mounted on said reduced diameter portion of said stem member abutting said shoulder and in close proximity to said annular face portion of said piston and including a peripheral edge in close proximity to said cylinder bore, and fluid bleed means in communication with the upper portion of said cylinder bore, whereby movement of the bleed fluid through said piston is directed adjacent said annular piston face past said piston seal means, adjacent said cylinder bore and out said bleed means removing substantially all air entrapped in said hydraulic cylinder.

4. In a hydraulic pressure system as set forth in claim 3, said fluid directing means comprising a circular disc-like member.

5. In a hydraulic pressure system as set forth in claim 3, said seal means comprising a double-lipped seal member of resilient material.

6. In a hydraulic pressure system: a hydraulic cylinder body with a bore therein, a piston assembly in said bore dividing said bore into a high pressure chamber and a low pressure chamber and being movable from a retracted position in said bore to displace fluid therefrom, sealing means carried by said piston for preventing fluid flow from said high pressure chamber to said low pressure chamber past said piston assembly, said sealing means at all times being in sliding engagement with the sidewalls of said bore and being generally immovably supported relating to said piston assembly, said cylinder body being supported in such manner that said high pressure chamber extends generally horizontally, venting means in the sidewalls of said high pressure chamber for venting said high pressure chamber, and said piston assembly having a passageway therethrough for communicating said high and low pressure chambers, valve means for said passageway providing communication between said high and low pressure chambers when said piston is in its retracted position and for closing said passageway when said piston is moved out of its retracted position, the portion of said passageway on the high pressure chamber side of said valve means extending generally laterally into communication with said high pressure chamber in the region adjacent the face of said sealing means to direct an impinging flow of hydraulic fluid past the face of said sealing means into engagement with the sidewalls of said high pressure chamber, and means for producing hydraulic pressure in said low pressure chamber to create said impinging flow of fluid, whereby air pockets adjacent said sealing means and the sidewalls of said high pressure chamber are swept out through said venting means.

References Cited in the file of this patent

UNITED STATES PATENTS

| | | |
|---|---|---|
| 2,106,758 | Oliver | Feb. 1, 1938 |
| 2,317,473 | Miller | Apr. 27, 1943 |
| 2,455,984 | Elliott | Dec. 14, 1948 |
| 2,561,009 | Byers et al. | July 17, 1951 |
| 2,598,604 | Ringer | May 27, 1952 |
| 2,638,748 | Miller | May 19, 1953 |
| 2,670,603 | Allin et al. | Mar. 2, 1954 |